(12) United States Patent
Ye et al.

(10) Patent No.: US 12,360,838 B2
(45) Date of Patent: Jul. 15, 2025

(54) MANAGING AUDIT LOGS IN A PRODUCTION ENVIRONMENT

(71) Applicant: Dell Products L.P., Round Rock, TX (US)

(72) Inventors: Jason Ye, Shanghai (CN); Tianming Zhang, Brighton, MA (US); Carl Shi, Shanghai (CN); Jia Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 17/974,024

(22) Filed: Oct. 26, 2022

(65) Prior Publication Data

US 2024/0143431 A1    May 2, 2024

(51) Int. Cl.
*G06F 11/07* (2006.01)

(52) U.S. Cl.
CPC ...... *G06F 11/0784* (2013.01); *G06F 11/0778* (2013.01); *G06F 11/0781* (2013.01); *G06F 11/0706* (2013.01)

(58) Field of Classification Search
CPC ............ G06F 11/0775; G06F 11/0781; G06F 11/0778; G06F 11/3072; G06F 11/3082; G06F 11/3065; G06F 11/0784
See application file for complete search history.

(56) References Cited

U.S. PATENT DOCUMENTS

| | | | |
|---|---|---|---|
| 7,475,401 B1 * | 1/2009 | Frey | G06F 11/3476 719/313 |
| 7,506,314 B2 * | 3/2009 | Kollmann | G06F 11/3476 714/45 |
| 2008/0114571 A1 * | 5/2008 | Campbell | G05B 19/4183 702/189 |
| 2008/0168242 A1 * | 7/2008 | Eberbach | G06F 11/3495 711/E12.001 |
| 2009/0222492 A1 * | 9/2009 | Yamauchi | G06F 11/3476 |
| 2011/0270957 A1 * | 11/2011 | Phan | H04L 41/0622 709/224 |
| 2017/0168917 A1 * | 6/2017 | Doi | G06F 11/3636 |
| 2019/0286628 A1 * | 9/2019 | Zhou | G06F 11/0709 |
| 2019/0324649 A1 * | 10/2019 | Rodgers | G06F 9/544 |
| 2020/0382529 A1 * | 12/2020 | Higgins | H04L 63/1425 |

FOREIGN PATENT DOCUMENTS

WO    WO-0047003 A1 *    8/2000    ......... H04L 41/0604

* cited by examiner

*Primary Examiner* — Gabriel Chu
(74) *Attorney, Agent, or Firm* — Jackson Walker L.L.P.

(57) ABSTRACT

Disclosed systems and methods include or support a message logging service in which, responsive to receiving an event message generated by a business function, the message is logged in accordance with a message severity, one or more severity level attributes of the system, and one or more message logging criterion. Responsive to determining the message severity meets a first criterion, the message may be routed to and saved within a first persistent log file. Responsive to determining the message severity satisfies a second criterion, the message may be temporarily stored to a FIFO message queue, for possible inclusion in a second persistent log file. A health monitoring service for monitoring application programs corresponding to various business functions, upon detecting a degraded health state of a business function, may cause messages stored in the message queue to be dumped to a second persistent log file.

10 Claims, 2 Drawing Sheets

MANAGING AUDIT LOGS IN A PRODUCTION ENVIRONMENT

TECHNICAL FIELD

The present disclosure relates to information handling systems and, more particularly, diagnosing sources of information handling systems errors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be provisioned with capability for generating messages identifying specified events, states, conditions, exceptions, faults, errors, flags, and the like that may occur during operation. Such messages may be referred to herein generically as event messages.

Event messages may be saved to a file, referred to herein as an audit log or event log, for purposes of facilitating the identification, diagnosis, and resolution of undesirable events that may occur. Event messages may vary with respect to the significance or severity of the applicable event. When data center servers and other types of information handling systems have been fully tested, they may be deployed to a production environment in which the volume of message activity may be very high and the expected probability of serious errors is very low. In such environments, it may be desirable for performance and conservation reasons, to limit the types of event messages that are saved to an operational log file. However, there may be other times when it is desirable to log all event messages that include any information potentially useful for diagnostic purposes.

SUMMARY

Common problems associated with the inherent tension between maintaining adequate event logs for use in diagnosing system failures and maximizing performance and conserving potentially scarce resources by limiting event logs are addressed by systems and methods disclosed herein. Disclosed systems and methods may include or support a message logging service in which, responsive to receiving an event message generated by a business function executing in an information handling system, the message is logged in accordance with (1) a message severity, indicative of a severity of the message, (2) one or more severity level attributes of the information handling system, and (3) one or more message logging criterion. In at least one embodiment, responsive to determining that the message severity meets a first criterion, the message may be routed to and saved within a first persistent log file. Responsive to determining the message severity satisfies a second criterion, the message may be temporarily stored to a message queue, for possible inclusion in a second persistent log file. The message queue may be implemented as a first-in first-out (FIFO) queue, wherein messages reside in the FIFO queue only for a determinable window of time such as the window of time required to shift the message through the message FIFO queue. If the message is shifted out of the FIFO queue before it is dumped or otherwise saved to persistent storage, the message is lost.

The system may include a health monitoring service that monitors a health state of system resources including application programs corresponding to various business functions. Responsive to detecting a flag indicating a degraded health state of any of the one or more services, messages stored in the message queue may be dumped to a second persistent log file.

In at least some embodiments, the severity level attributes include a minimum severity level attribute indicative of a minimum message severity required for logging a message and a heightened logging severity attribute defining messages that may be logged when a health state of a business function degrades. Each severity level attribute may be selected from a predefined group of severity levels. In an exemplary embodiment, the available severity levels may include, in order of increasing severity, TRACE, DEBUG, INFORMATIONAL (INFO), WARNING, ERROR, and FATAL where TRACE level messages provide detailed information related to code flow, DEBUG level messages provide detailed information that may be useful when diagnosing problems, INFO level messages provide information related to operational events, WARNING level messages indicate that, although the software is still working as expected, something unexpected has happened or that some problem is likely to occur in the near future, (e.g., configuration or network issues such as time outs, retries, and the like, ERROR level messages indicate a problem resulting in the software being unable to perform some function, and FATAL level messages indicate that the software may not be able to continue running.

In at least some such embodiments, the first criterion may be satisfied when a message's severity level equals or exceeds the system's minimum severity level attribute and the second criterion may be satisfied when the message's severity level equals or exceeds a severity level attribute referred to herein as the heightened logging severity level attribute, which may be lower than the minimum severity level attribute. For example, if the system's minimum severity level attribute is set to INFO and the system's heightened logging severity level attribute is set to DEBUG, then an INFO+ message, i.e., a message having a severity level greater than or equal to INFO, satisfies the first criterion and is, therefore, stored to a first log file in persistent storage while a DEBUG+ message satisfies the second criterion and is, therefore, queued in a FIFO buffer or similar resource, where the message will reside for a determinable interval. If a monitoring service detects an issue associated with a business function that is generating event messages, messages queued in the FIFO buffer may be dumped to a second log file in persistent storage. In this manner, a system may generate and preserve an INFO level log while also maintaining a DEBUG level log containing recently generated DEBUG level messages, i.e., DEBUG level messages that have not propagated out of the FIFO buffer. Systems may also support a maximum severity level attribute that may be used in conjunction with the minimum severity level attribute to further manage and customize audit logs.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
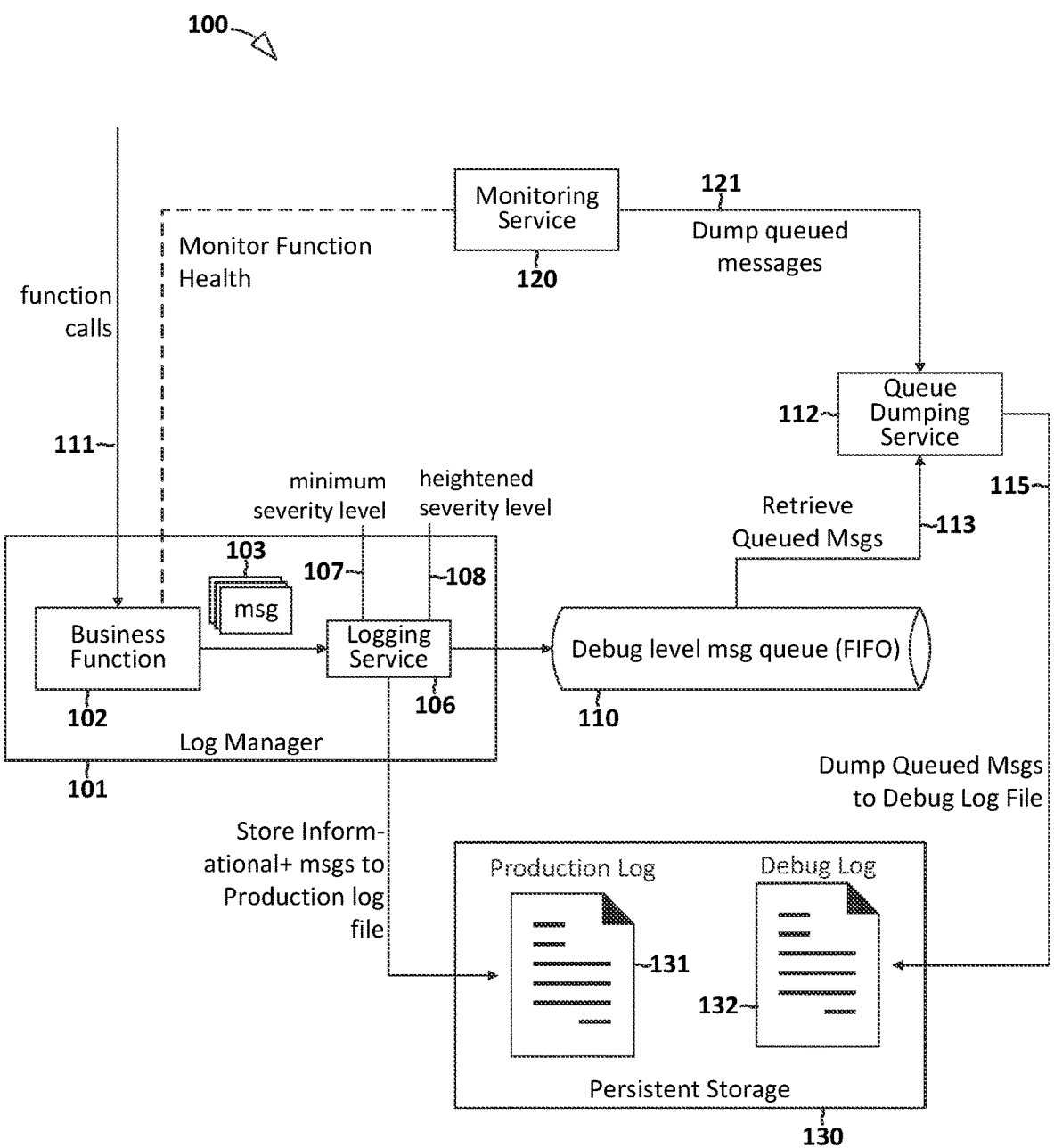
FIG. 1 illustrates an block diagram illustrating message logging features of an information handling systems in accordance with disclosed teachings.
Figure 2:
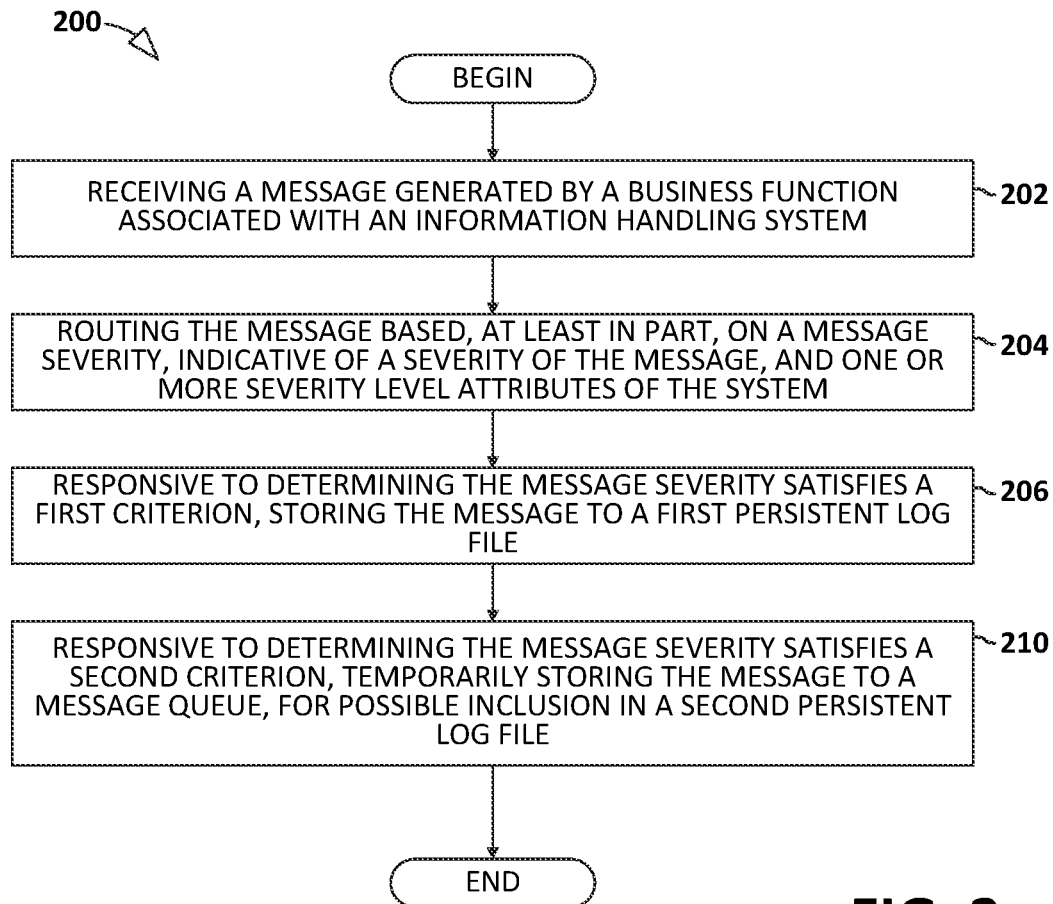
FIG. 2 illustrates a flow diagram of a message logging method in accordance with disclosed teachings.
Figure 3:
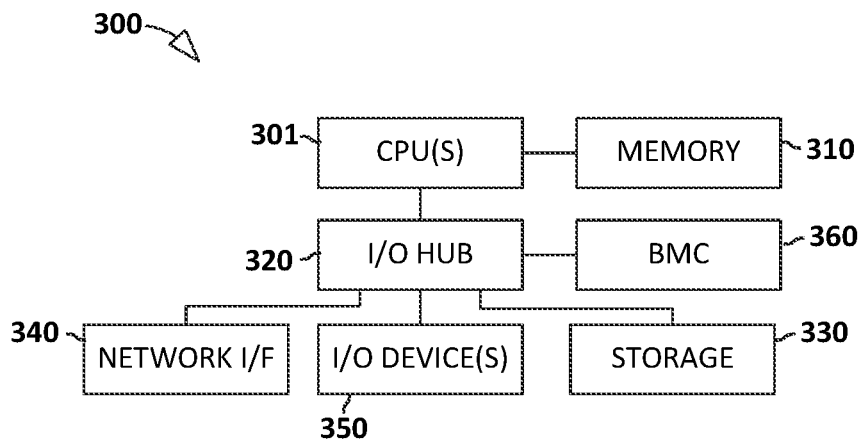
FIG. 3 illustrates an exemplary information handling system suitable for use in conjunction with features disclosed in FIG. 1 through FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electro-magnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a block diagram of messaging logging features of an information handling system 100 in accordance with disclosed teachings. The messaging logging features illustrated in FIG. 1 are particularly suitable for use in conjunction with a system running in a production environment in which application software associated with a business function is made available to end users. The system 100 illustrated in FIG. 1 includes a log manager 101, a business function 102, a logging service 106, a log message queue 110, a queue dumping service 112, and a monitoring service 120. FIG. 1 illustrates an exemplary implementation in which system 100 supports two or more threshold severity level attributes for defining messages that may be included in an audit log.

FIG. 1 is described for an implementation in which a minimum severity level attribute is set to INFO and a heightened logging severity level attribute is set to DEBUG. Although FIG. 1 is described for this particular implementation, those of ordinary skill in the art will readily appreciate that the illustrated severity levels are exemplary and illustrative only and that more and/or different message severity levels may be substituted for the severity levels described with respect to FIG. 1.

The log manager 101 illustrated in FIG. 1 encompasses and/or interacts with business function 102, e.g., a front end web server, which is illustrated receiving and processing function calls 111. Event messages 103 generated by business function 102 are sent to a logging service 106. Logging service 106 processes messages 103 in accordance with the message's severity level, one or more severity level attributes of system 100, and one or more rules, criteria, or the like. The one or more severity level attributes that logging service 106 may consider include a minimum severity level attribute 107 and a heightened logging severity level attribute 108.

In an exemplary implementation, minimum severity level attribute 107 has a value of INFO, and heightened logging severity level attribute 108 has a value of DEBUG. In this configuration, logging service 106 evaluates the severity level of each message 103 and routes the message to one or possibly two destinations based on two predefined logging criteria. In at least one embodiment, a first logging criterion is satisfied when a severity level of the message is greater than or equal to minimum severity level 107 and a second logging criteria is satisfied when the message's severity level is greater than or equal to heightened logging severity level 108.

Continuing with this example, logging service 106 routes INFO+ messages, i.e., messages having a severity level greater than or equal to INFO, to a production log file 131 in a persistent storage resource 130. In addition, logging service 106 routes DEBUG+ messages to message queue FIFO 110, where they will remain for a finite and determinable window of time as they propagate through the FIFO.

As depicted in FIG. 1, monitoring service 120 monitors health state information of business function 102 and determines a health status of business function 102. If a monitoring service 120 detects business function 102 in any of one or more predefinable health states, monitoring service 120 may send a dump queued message signal 121 to queue dumping service 112. The illustrated queue dumping service 112 may be configured to respond to receiving a dump queued message signal 121 from monitoring service 120 by retrieving (operation 113) queued messages from message queue 110 and dumping (operation 115) the messages retrieved from message queue 110 to a debug log file 132 in persistent storage 130.

Referring now to FIG. 2, an exemplary method 200 for logging event messages generated by a business function executing in an information handling system is illustrated. The method 200 illustrated in FIG. 2 includes receiving (operation 202) a message generated by a business function associated with an information handling system. The message is then routed (operation 204) based, at least in part, on a severity of the message, and one or more severity level attributes of the information handling system. As depicted in FIG. 2, responsive to determining the message severity satisfies a first criterion, the message may be stored (operation 206) to a first persistent log file. In addition, responsive to determining the message severity satisfies a second criterion, the message is temporarily stored (operation 210) to a message queue, for possible inclusion in a second persistent log file. The first criterion may be associated with a minimum severity attribute while the second criterion may be associated with the heightened logging level attribute. In this manner, the disclosed method 200 may recognize two distinct minimum threshold severity levels. During normal operation, when the health state of the business function is normal, a production log of INFO level messages is maintained. If the health state of the business function changes, DEBUG level logging is triggered.

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:

configuring a logging service to receive and process event messages generated by a business function, wherein each event message is associated with a message severity and wherein the logging service evaluates the message severity of each event message and routes at least some of the event messages to one or more storage resources in accordance with the message severity of each event message, wherein the logging service:

routes event messages having a message severity exceeding a first threshold to a first log file in a persistent storage resource; and routes event messages having a message severity exceeding a second threshold, higher than the first threshold, to a buffer storage for temporarily storing event messages;

configuring a monitoring service to monitor a health status of the business function and generate a dump queued message (DQM) signal indicative of whether the health status of the business function is any of one or more predefined health states;

configuring a queue dumping service (DQS) to:

receive the DQM signal;

responsive to detecting the DQM signal indicating the health status of the business function in any of the one or more predefined health states, retrieve buffered event messages, comprising event messages stored in the buffer storage, and dump the buffered event messages retrieved from the buffer storage to a debug log file in the persistent storage resource.

2. The method of claim 1, wherein the buffer storage comprises a first in first out (FIFO) buffer.

3. The method of claim 1, wherein the first threshold comprises an informational message severity and the second threshold comprises a debug message severity, wherein the debug message severity corresponds to messages containing information potentially useful for diagnosing a problem and wherein the informational message severity corresponds to messages comprising information related solely to operational events.

4. The method of claim 1, wherein the business function comprises a front end web server.

5. The method of claim 4, wherein the front end web server receives and processes function calls for the business function.

6. An information handling system comprising:

a central processing unit (CPU);

a system memory, accessible to the CPU, including processor executable instructions that, when executed by the CPU, cause the system to perform operations including:

configuring a logging service to receive and process event messages generated by a business function, wherein each event message is associated with a message severity and wherein the logging service evaluates the message severity of each event message and routes at least some of the event messages to one or more storage resources in accordance with the message severity of each event message, wherein the logging service:

routes event messages having a message severity exceeding a first threshold to a first log file in a persistent storage resource; and routes event messages having a message severity exceeding a second threshold, higher than the first threshold, to a buffer storage for temporarily storing event messages;

configuring a monitoring service to monitor a health status of the business function and generate a dump queued message (DQM) signal indicative of whether the health status of the business function is any of one or more predefined health states;

configuring a queue dumping service (DQS) to:

receive the DQM signal;

responsive to detecting the DQM signal indicating the health status of the business function in any of the one or more predefined health states, retrieve buffered event messages, comprising messages stored in the buffer storage, and dump the buffered event messages retrieved from the buffer storage to a debug log file in the persistent storage resource.

7. The information handling system of claim 6, wherein the buffer storage comprises a first in first out (FIFO) buffer.

8. The information handling system of claim 6, wherein the first threshold comprises an informational message severity and the second threshold comprises a debug message severity, wherein the debug message severity corresponds to messages containing information potentially useful for diagnosing a problem and wherein the informational message severity corresponds to messages comprising information related solely to operational events.

9. The information handling system of claim 6, wherein the business function comprises a front end web server.

10. The information handling system of claim 9, wherein the front end web server receives and processes function calls for the business function.

* * * * *